United States Patent [19]

Schwind et al.

[11] 4,446,099

[45] May 1, 1984

[54] DEVICE FOR PROTECTING CONTROL CLUSTER ACTUATING MECHANISMS DURING THE TESTING OF A NUCLEAR REACTOR

[75] Inventors: Jacques Schwind, Sucy-En-Brie; Camille Le Feuvre, Paris, both of France

[73] Assignee: Framatome, Courbevoie, France

[21] Appl. No.: 281,742

[22] Filed: Jul. 9, 1981

[30] Foreign Application Priority Data

Jul. 31, 1980 [FR] France .................. 80 16881

[51] Int. Cl.³ .................. G21C 17/00; G21C 9/00
[52] U.S. Cl. .................. 376/277; 376/260; 376/249; 376/313; 210/232; 210/489
[58] Field of Search ............. 376/245, 249, 313, 314, 376/260, 246, 205, 203, 277; 210/489, 232, 238

[56] References Cited

U.S. PATENT DOCUMENTS

| | | | |
|---|---|---|---|
| 3,111,489 | 11/1963 | Getzin | 210/232 |
| 3,276,597 | 10/1966 | Mesek et al. | 210/489 |
| 3,367,497 | 2/1968 | Loock et al. | 210/232 |
| 3,862,036 | 1/1975 | Simmons | 210/489 |
| 3,940,996 | 3/1976 | Lauhoff et al. | 376/246 |
| 3,986,960 | 10/1976 | Wire et al. | 210/232 |
| 3,993,539 | 11/1976 | Atherton et al. | 376/246 |
| 4,028,248 | 6/1977 | Marauskas et al. | 210/232 |
| 4,036,690 | 7/1977 | Betts et al. | 376/313 |
| 4,096,032 | 6/1978 | Mayers et al. | 376/313 |
| 4,157,968 | 6/1979 | Kronsbein | 210/489 |
| 4,193,844 | 3/1980 | Neumann et al. | 376/314 |
| 4,255,235 | 3/1981 | Dubourg | 376/246 |
| 4,324,616 | 4/1982 | Marmorat et al. | 376/205 |

*Primary Examiner*—Harvey E. Behrend
*Attorney, Agent, or Firm*—Pollock, Vande Sande & Priddy

[57] ABSTRACT

The invention relates to a protective device for the actuating mechanisms of the control clusters during tests under pressure of the primary circuit of a nuclear reactor. Before mounting the clusters, each guidance sheath for the parts connecting the clusters with the control mechanisms is provided with a removable filter dismountably fixed at the lower portion of the sheath. The filter is constituted by several metal gauzes. The invention is applicable to pressurized water nuclear reactors.

3 Claims, 3 Drawing Figures

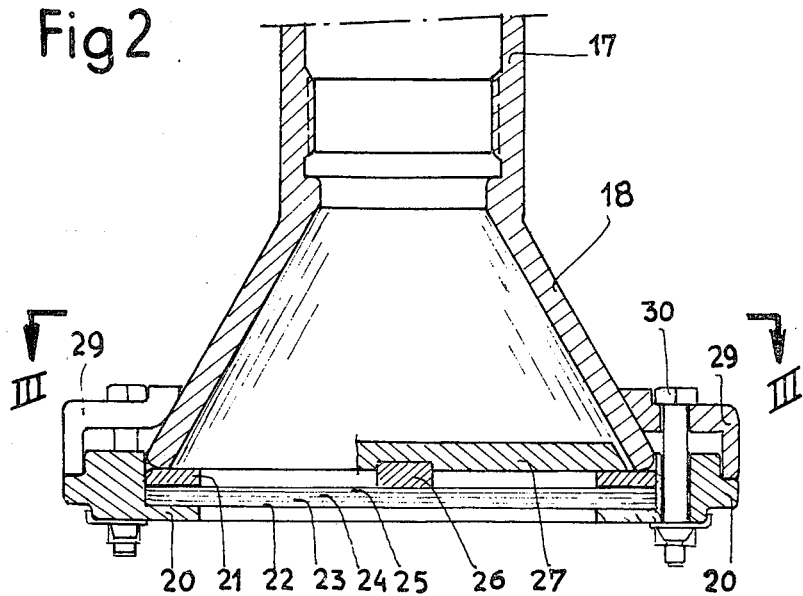
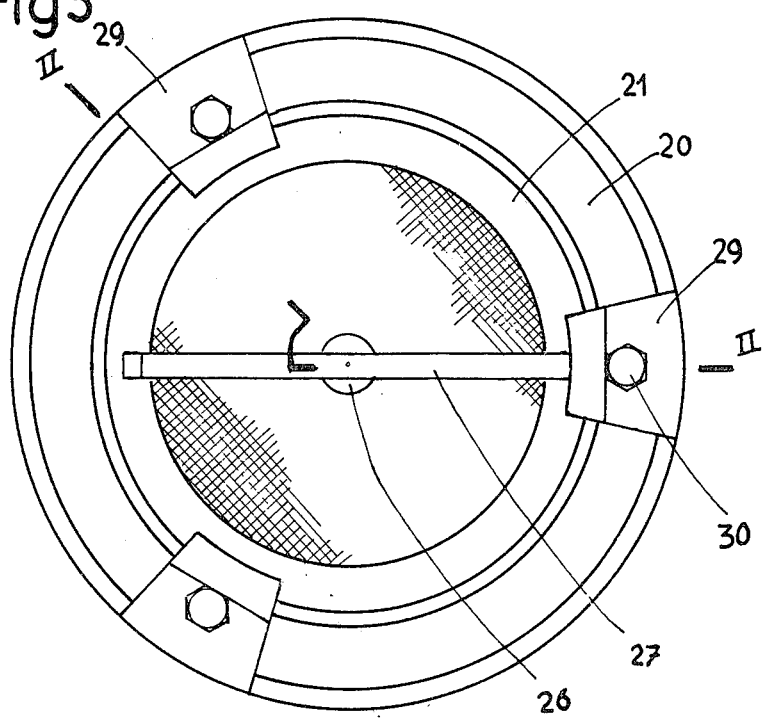

DEVICE FOR PROTECTING CONTROL CLUSTER ACTUATING MECHANISMS DURING THE TESTING OF A NUCLEAR REACTOR

FIELD OF THE INVENTION

The present invention relates to a protective device for the actuating mechanisms of the control clusters during the testing of a nuclear reactor, more particularly for use in hot and cold testing of the primary circuit of a pressurized water reactor.

BACKGROUND OF THE INVENTION

A pressurized water nuclear reactor comprises a tank which encloses fuel elements generating heat by the nuclear reactions that they produce. The zone of the fuel elements is surmounted by a zone enclosing the various control clusters for regulating the reactivity of the assemblies, and the various guidance members of these clusters. The suitable positioning of the clusters, more or less engaged between the fuel elements, is determined by actuating mechanisms outside the tank with, between the mechanisms and the clusters, connecting parts engaged in sheaths for traversing the cover of the tank. Generally the guidance and traversing sheath of the cover are terminated by a conical flared end-part in the vicinity of the upper support plate of the cluster guides.

Before starting up a nuclear power station, it is the rule to proceed with tests under pressure, when hot and when cold, by causing water to circulate in the primary circuit which, in service, is used to transfer the heat from the core of the reactor to the secondary exchanges. These tests are also used to detect and remove debris, turnings or filings which, in spite of the precautions taken during the assembly of the tank and of the primary equipment, can exist within the primary circuit.

French patents published under Nos. 2,280,178 and 2,413,757 describe filters used to trap such impurities, positioned on the lower plate of the core which, in service, supports the fuel assemblies. However, such filters, sometimes supplemented by flow measuring devices, result in pressure drops which are all the greater as the meshes of the filtering gauzes are finer. There is hence a limit to the fineness of the mesh of the filters located on the lower plate of the core, so that there can subsist within the circuits very fine particles of impurities which, precisely because of their fineness, can reascend to the upper parts of the tank, and therethrough be engaged in the traversal sheaths of the cover and reach the actuating mechanisms of the control rod clusters. To these particles passed through the filters of the lower plate of the core, particles detached downstream of the filters can be added, and these may also reascend to the sheath of the mechanisms and to the mechanisms themselves. This is very prejudicial to the safety of the operation of the reactor since, if the particles become deposited within the control rod mechanisms, they may cause subsequent faulty operation as a result of wear, jamming, or the like.

OBJECT OF THE INVENTION

It is an object of the present invention to provide a device which permits, without affecting the pressure drops in the test flow in the primary circuit, protection also of the control cluster actuating mechanisms which form a part of the pressurized vessel.

It is also an object to provide a device which is applicable to a reactor comprising reactivity control clusters positioned within the tank of the reactor and actuated by mechanisms outside the tank by means of connecting parts engaged in guidance casings passing through the cover of the tank.

Other objects and advantages will become apparent from the description which follows.

SUMMARY OF THE INVENTION

According to the invention there is provided a device wherein, during the testing of the primary circuit, and before mounting the clusters and the connecting parts, each guidance and passage sheet is provided, at its lower portion opening into the tank, with a removable filter dismountably fixed at the end and covering the whole open cross-section of the sheath.

In a particular and preferred embodiment of the invention, each filter is constituted by a support rim, a set of metal gauzes with different mesh calibers, held against the support rim, and rapid mounting and dismounting fastening means at the end of the sheath.

The invention will be more clearly understood with reference to a particular embodiment given purely by way of illustrative example and shown in the accompanying drawings.

BRIEF DESCRIPTION OF THE DRAWINGS

FIG. 2 is an axial section, along the line II—II of FIG. 3, of the end of a guidance sheath provided with its filter, according to a preferred embodiment of the invention.

FIG. 3 is a plan view of the filter alone, along the line III—III of FIG. 2.

DETAILED DESCRIPTION OF AN EMBODIMENT

Figure 1:
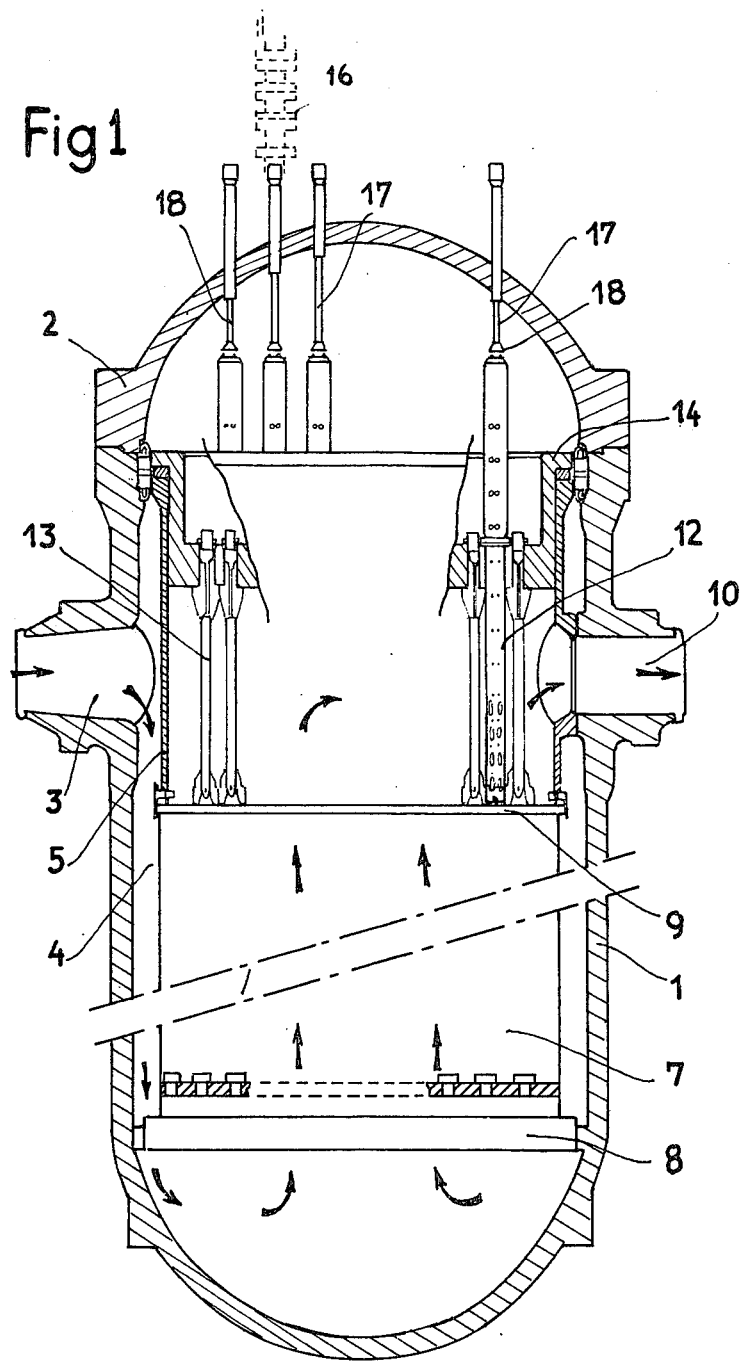
FIG. 1 is a simplified diagrammatic section of the whole of the tank of a pressurized water reactor.

FIG. 1 shows the usual structure of the tank of a pressurized water nuclear reactor, wherein the tank proper 1 and its cover 2 define a space which, in service, is traversed by the flow of primary cooling fluid. For each flow loop, the cold fluid enters through an inlet 3 and descends in the annular space 4 formed between the wall of the tank and the cylindrical jacket 5 of the core. The fluid then reascends through the core 7, by passing through the openings of the lower core plate 8, then between the fuel elements of the core where it is heated, then through the openings of the top plate 9, before being discharged through the outlet 10 to the steam generator.

The guides 12 of the control clusters and the bracing columns 13 are arranged between the top plate 9 of the core and the top support plate 14. The actuating mechanisms 16 of the control clusters are positioned outside the tank, above the cover, and the tie-rods traverse the latter in the tubular sheaths 17. The sheaths 17 open into the dome of the tank, above the top support plate, through a conical flared end-piece 18.

On testing of the primary circuit, each end-piece 18 receives a filter which is shown in detail by FIGS. 2 and 3. It comprises a support rim 20 having an inner spot facing of a diameter slightly greater than the outer diameter of the end-piece, so that it can be fitted thereover. A retaining ring 21, welded into the spot facing of the rim, imprisons a series of four filtering metal gauzes.

There is thus to be found successively, from the rim 20 to the ring 21, (a) a first relatively coarse filter 22, of 0.4 to 0.5 mm wire and 1 mm mesh, (b) a fine filter 23, of 0.032 mm wire and 0.05 mm mesh, (c) a second relatively coarse filter 24, identical with the first, the two coarse filters holding the fine filter between them, and (d) a support filter 25, of 1.4 mm wire and 5.6 mm mesh.

The group of four filtering gauzes is reinforced by a central support 26, transferring the forces to a support bar 27 welded at its ends to the ring 21.

The support rim and its filtering gauzes are held in place at the end of the end-piece by three clamps distributed at 120° and each gripped against the rim and the end-piece by an angle bracket 29 with a captive nut and nut-lock 30 of the usual type.

Each filtering unit can thus be positioned easily and without special tooling before the tests, and rapidly dismounted after testing.

Thus, the finest particles in suspension in the primary testing fluid will be retained and, if necessary, trapped in the upper zone of the tank that they can reach due to their fineness, without risk of their reaching the actuating mechanisms, and without introducing an additional pressure drop into the general flow of the primary test fluid. This renders it possible to use, for the filters of the lower plate of the core, a mesh size limiting these pressure drops.

The invention is not strictly limited to the embodiment which has just been described by way of example, but also covers embodiments which differ therefrom only in detail, in modifications or in the use of equivalent means. This relates particularly to the exact mesh size of the metal gauzes, and the fastening means at the end of the guidance sheaths, which can depend on the shape of the end-pieces of these sheaths.

We claim:

1. A system of protecting control cluster actuating mechanisms by removing potentially harmful debris from a nuclear reactor coolant circulation system before loading the reactor with fuel assemblies and during pre-operational testing, comprising (a) a pressure vessel having a cover secured in fluid-tight relationship therewith;

(b) a coolant inlet and outlet in said vessel for accommodating flow of coolant therethrough;

(c) spaced upper and lower core plates having coolant flow openings therein attached to support members in said pressure vessel, said upper and lower core plates providing an empty space therebetween otherwise occupied by said fuel assemblies;

(d) an upper structure mounted near the top of said pressure vessel and control rod guide tubes and support adapters mounted between said upper structure and said upper core plate;

(e) lower filter assemblies mounted on and covering the openings in said lower core plate; and (f) upper filter assemblies removably fixed to the lower, flared ends of tubular sheaths connecting said control cluster actuating mechanisms with the interior of said vessel, said upper filter assemblies comprising a plurality of metal gauzes covering the entire open cross section of said sheaths and having mesh calibers smaller than those of said lower filter assemblies;

(g) whereby said upper filter assemblies prevent the flow of metal particles past said metal gauzes when a flushing liquid is circulated through said reactor during preoperational testing.

2. Device according to claim 1, wherein each said upper filter assembly comprises (a) a support rim;

(b) a set of said metal gauzes with different mesh calibers, held against the support rim by a retaining ring; and (c) rapid mounting and dismounting fastening means at the end of each said sheath.

3. Device according to claim 2, wherein said set of metal gauzes comprises (a) a support gauze with meshes of the order of 5.6 mm; and (b) a gauze with meshes of the order of 0.05 mm gripped between two gauzes with meshes of the order of 1 mm.

* * * * *